United States Patent Office 2,712,234
Patented July 5, 1955

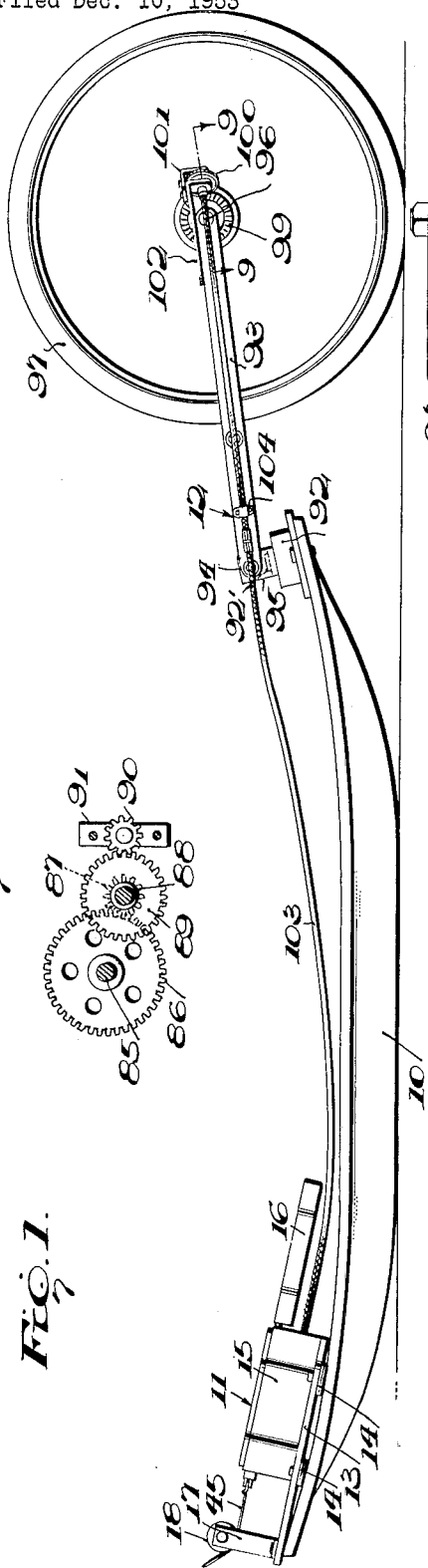
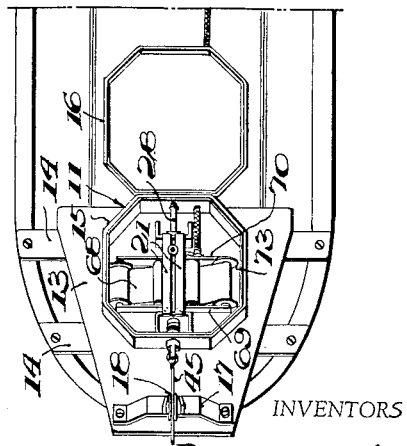

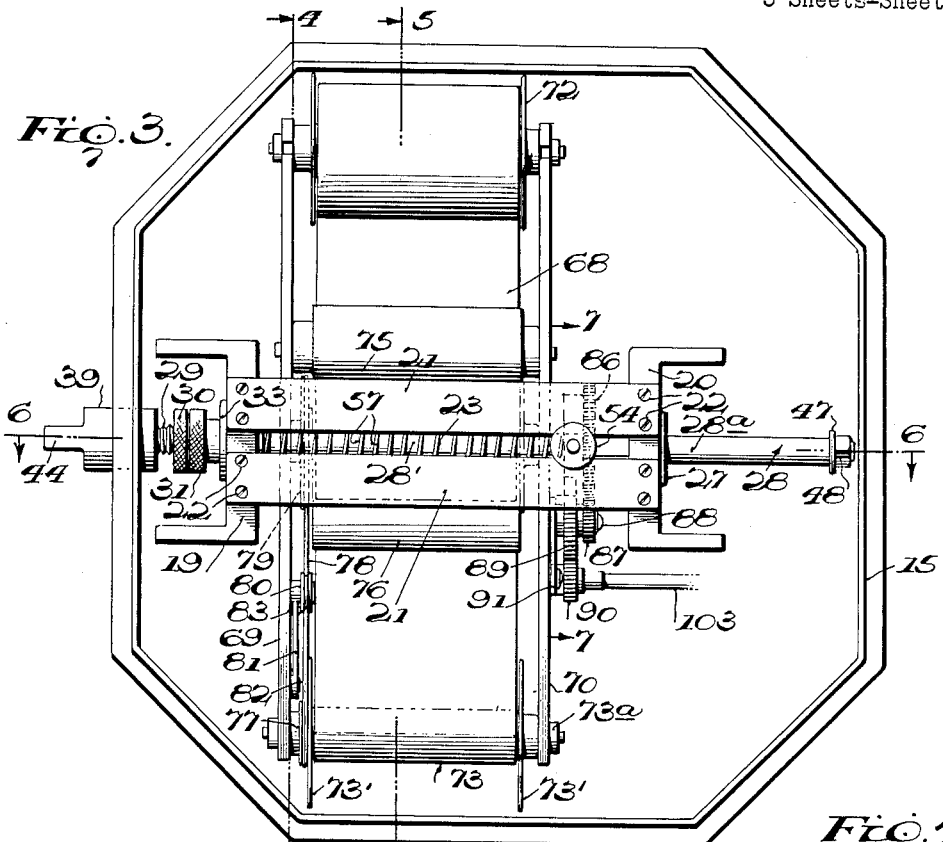
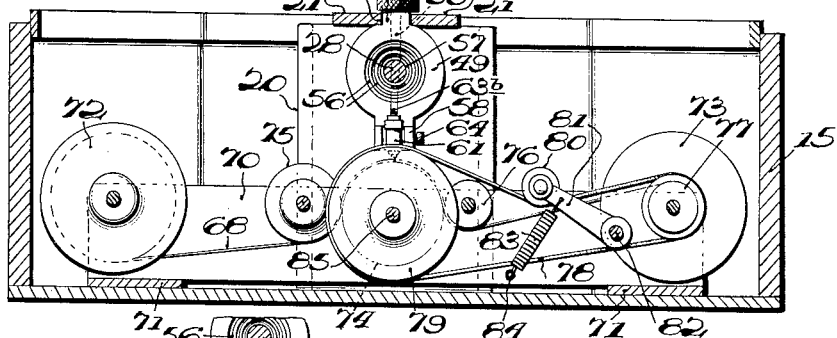
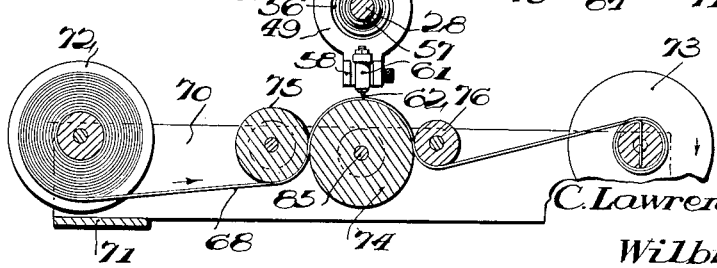

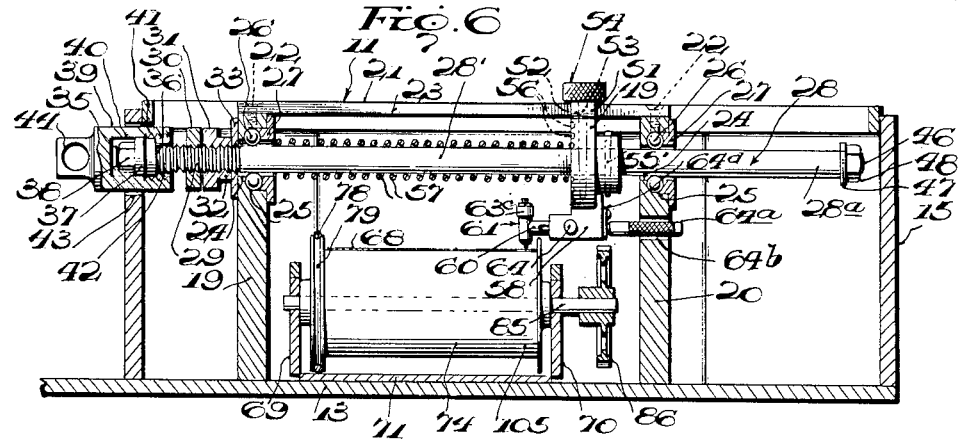
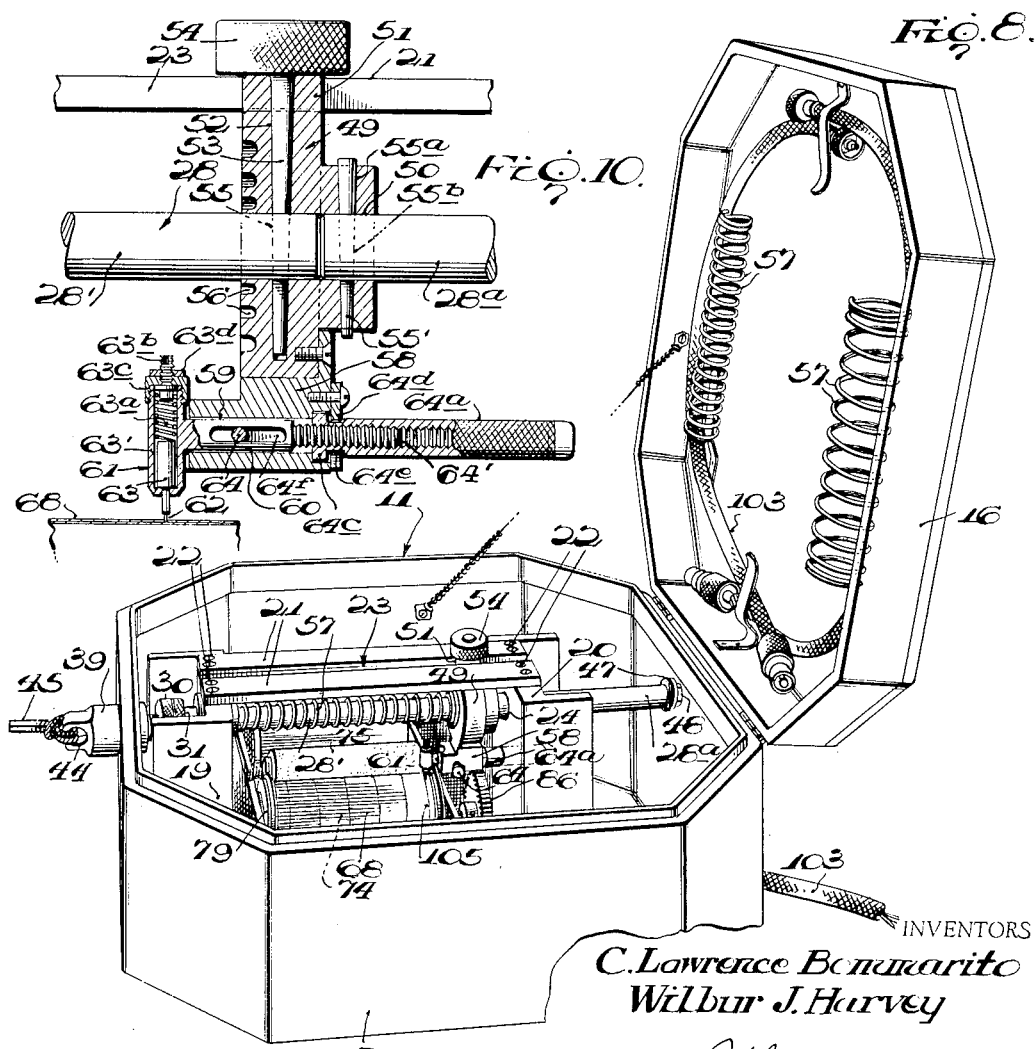

2,712,234

WORK MEASURING APPARATUS

Ciro Lawrence Bommarito, Medford, and Wilbur J. Harvey, North Andover, Mass., assignors to the United States of America as represented by the Secretary of the Army Application December 10, 1953, Serial No. 397,495

6 Claims. (Cl. 73—141)

(Granted under Title 35, U. S. Code (1952), sec. 266)

The invention described herein, if patented, may be manufactured and used by or for the Government for governmental purposes, without the payment to us of any royalty thereon.

Our invention relates to work measuring apparatus, and more particularly to apparatus for measuring the amount of work done in pulling a trailing load.

An important object of the invention is to provide simplified means for measuring the amount of work done by a man pulling a sled or like trailing load.

A further object of the invention is to provide work measuring apparatus of the above-mentioned character including means to plot on graph paper the locus of a point which is, at any instant, on the distance base, a measure of the force required to pull a given trailing load.

A further object is to provide apparatus of the above-mentioned character which is adapted to be readily connected with various types of trailing loads, and adjustable to record a wide range of forces needed to move the various loads.

A still further object is to provide apparatus of the above-mentioned character which is easy to assemble, disassemble and adjust, reliable and efficient in operation, and relatively inexpensive to manufacture.

Other objects and advantages of the invention will be apparent during the course of the following description.

In the accompanying drawings, forming a part of this application, and in which like numerals are employed to designate like parts throughout the same, Figure 1 is a side elevation of apparatus embodying our invention, and showing the same associated with a sled, Figure 2 is a plan view of the apparatus and sled, part broken away, Figure 3 is an enlarged plan view of the recording part of the apparatus removed, Figure 4 is a transverse vertical section on line 4—4 of Figure 3, Figure 5 is a similar section on line 5—5 of Figure 3, Figure 6 is a central vertical longitudinal section on line 6—6 of Figure 3, Figure 7 is a fragmentary vertical section on line 7—7 of Figure 3, Figure 8 is a perspective view of the recording portion of the apparatus, and the housing for the same, Figure 9 is an enlarged fragmentary detail section taken on line 9—9 of Figure 1, and Figure 10 is an enlarged fragmentary central vertical section through the recording stylus and associated elements.

In the drawings, where for the purpose of illustration is shown a preferred embodiment of our invention, the numeral 10 designates a boat type sled, which is one illustrative example of a trailing load with which our work measuring apparatus may be used. It should be pointed out here, that the apparatus is capable of use with various other types of trailing loads, and we do not wish to limit the use of the apparatus to the particular trailing load shown in Figures 1 and 2 of the drawings.

The apparatus proper comprises forward and rear units 11 and 12, which are independently connected with the load 10, and operatively connected together, in a manner to be described. The forward unit 11 is the part of the apparatus which reflects the measurement of the force required to pull the load 10, and also contains the recording or curve drawing mechanism. The rear unit 12 is the part of the apparatus concerned with measuring the distance traveled by the trailing load or sled 10, in response to the pulling force applied to the forward unit 11.

The forward unit 11, in the embodiment of the invention shown, comprises a base plate 13, including transverse mounting bars 14, rigidly secured thereto, and bolted or otherwise rigidly secured to the sled 10, near the forward end of the same, as shown. Rigidly mounted upon the base plate 13 is a suitable box or housing 15 for the recording and force measuring part of the apparatus, and this box 15 is preferably equipped with a hinged cover 16, as shown in Figure 8.

Forwardly of the box or housing 15, an upstanding bracket 17 is rigidly mounted upon the base plate 13, and a guide pulley 18 is freely journaled upon the top of the bracket 17, and disposed near the top of the housing 15, as shown. The base plate 13 and mounting bars 14 constitute the means for mounting the forward unit 11 upon the particular trailing load 10 shown in the drawings, and when the apparatus is to be used with another type of trailing load, it may be necessary to modify somewhat the means for rigidly securing the housing 15 to the load, but such minor modification of the apparatus is well within the scope of the invention, as described, and set forth in the subjoined claims.

Arranged within the box or housing 15 in longitudinally spaced opposed relation are a pair of rigid upstanding support members or legs 19 and 20, having their tops extending near the top of the housing 15, as shown. A pair of laterally spaced parallel longitudinal guide bars 21 are rigidly secured at 22 to the tops of the members 19 and 20, and extend between these members, and form between them a longitudinal guide slot or passage 23.

The upstanding members 19 and 20 are provided near their upper ends with aligned openings 24, and recesses 25 in the rear sides of the members 19 and 20 receive ball bearings 26. The ball bearings are retained within the recesses 25 by retainer caps 27, rigidly secured to the members 19 and 20 as indicated. The ball bearings 26 project into the openings 24, Figure 6, for substantially frictionless engagement with a longitudinally shiftable pull rod or shaft 28. The pull rod 28 is bodily supported by the ball bearings 26, and is free from other connection with the members 19 and 20.

The pull shaft 28 extends for the entire distance between the members 19 and 20, and forwardly and rearwardly of the same for substantial distances, as shown. The pull shaft 28 is formed in two separate shaft sections 28′ and 28a, Figure 10, rigidly and detachably secured together by means to be described. Forwardly of the member 19, the pull shaft section 28′ has a screw-threaded portion 29, receiving a pair of knurled adjusting nuts 30 and 31. The rearmost nut 31 has a sleeve extension 32, integral therewith, and a rear annular bearing plate 33 is formed integral with the sleeve extension 32, and bears against the forward side of the member 19. Forwardly of the screw-threaded portion 29, the pull shaft section 28′ has a reduced screw-threaded extension 35 forming a shoulder 36. A thrust type ball bearing 37 is carried upon the reduced extension 35 of the pull shaft, and clamped against the shoulder 36 by means of a nut 38, cap screw or the like having screw-threaded engagement with the extension 35. A swivel coupling 39 has a recess 40 in its rear end, receiving the forward race of the thrust bearing 37, and the rear portion of the recess 40 is screw-threaded, as at 41 for the reception of a screw-threaded plug 42, which bears against the rear race or section of the thrust bearing 37, and serves to secure the coupling 39 to the pull shaft 28. The coupling 39 has a substantially frictionless swiveled connection with the pull shaft 28, through the bearing 37, and associated elements. The coupling 39 projects through a clearance opening 43 in the forward wall of the housing 15, and is provided at its forward end with an eye 44, by means of which a flexible element or rope 45 is secured to the pull shaft 28. The rope 45 is trained under the pulley 18, as shown in Figure 1, and leads to the harness of the man, not shown, pulling the sled 10. The purpose of the guide pulley 18 is to straighten out the flexible element 45 between the bracket 17 and coupling 39, so that a true axial pull will be imparted to the pull shaft 28 when tension is placed upon the rope 45, forwardly of the pulley 18.

The rear pull shaft section 28a in the unloaded condition, Figure 6, extends close to the rear side wall of the housing 15, and is provided with a reduced screw-threaded extension 46, carrying a flat washer 47 and nut 48, or the like. When the pull shaft 28 moves forwardly under the influence of the load upon the rope 45, the washer 47 will engage the cap 27, and serve as a positive stop to limit the extent of forward movement of the pull shaft 28.

A spring abutment plate or head 49 has an opening or bore 50, receiving the pull shaft sections 28' and 28a, and the head 49 is provided at its top with an integral guide lug 51, engaging slidably within the guide slot 23, and having a smooth running fit therein. A diametrical tapered opening 52 in the head 49 receives a long tapered pin 53 having a large knurled head 54. The tapered pin 53 is received by a tapered opening 55 in the pull shaft section 28', near the rear end of the latter, and the pin 53 serves to releasably rigidly secure the head 49 to the pull shaft section 28'.

The rear pull shaft section 28a is rigidly secured within the bore 50 of head 49 by a tapered pin 55', received by registering tapered openings 55a and 55b in the head 49 and pull shaft section 28a respectively.

The head 49 is provided in its forward side with a plurality of concentrically spaced annular recesses 56 of different diameters, for seating corresponding ends of main force measuring springs 57 provided in the apparatus. The particular size of the spring 57 is of course determined by the character of the load to be pulled by means of the rope 45, and the spring must be chosen to permit the pull rod 28 to move longitudinally through a proper distance range to keep the recording stylus, to be described, within the boundaries of the recording graph paper. Additional springs 57 of various sizes may be carried as spare parts within the cover 16, as indicated in Figure 8. The particular spring 57 shown in Figure 6, is merely illustrative of the use of the apparatus with a particular load 10, and it is not intended to limit the invention to any particular size of spring 57. The spring 57 surrounds the pull rod 28, between the head 49 and cap 27, and the rear end of the spring is centered within one of the grooves 56 of the head 49, and its other end bears against the cap 27. The coil spring 57 naturally tends to urge the pull rod 28 rearwardly, and maintain the bearing plate 33 in contact with the forward upright 19.

The head 49 is provided at its bottom with a block or extension 58, rigidly secured thereto and having a longitudinal bore 59 extending therethrough, slidably receiving a longitudinally movable adjusting shaft 60 of a recording stylus 61, rigidly secured thereto, and preferably formed integral therewith. The stylus 61 embodies an impression pin 62 having a rounded end, and is fixed to an enlarged cylinder 63, movable within the bore of the stylus body 63'. A compressible coil spring 63a within the stylus body 63' engages the cylinder 63 and urges it toward the lower end of the body 63'. The tension of the spring 63a is adjustable by a screw 63b, having screw-threaded engagement with a stylus cap 63c, rigidly secured to the top end of stylus body 63'. A lock nut 63d locks the adjusting screw 63b in the selected position. With the above arrangement, the stylus pin 63 can be adjusted to make clear and uniform markings upon the waxed surface of the recording paper used in the apparatus, regardless of changes in consistency of the wax, due to changes in temperature. If desired, an inking type stylus may be used instead of the impression type stylus 61, for warm weather operations.

The stylus adjusting shaft 60 has a screw-threaded extension 64', extending beyond one end of the block 58, Figure 10, and this extension 64' has mounted thereon a long knurled adjusting nut 64a, which projects through an opening 64b in the support 20. The nut 64a has a forward head 64c, received by an enlarged counterbore in the head 58, and a collar 64d engages a groove 64e of the nut 64a, to complete the swiveled connection of the nut with the block 58. The stylus 61 is bodily adjustable forwardly and rearwardly of the block 58, by means of the nut 64a and associated elements.

The adjusting shaft 60 of the stylus has a slot 64f in its side, receiving a setscrew 64, having screw-threaded engagement with the block 58. By this means, the shaft 60 is held against rotation during its longitudinal adjustment, and the stylus pin 62 is maintained normal to the surface of the recording paper. The setscrew 64 may also be used to positively lock the stylus 61 in the selected adjusted position.

Means are provided in the casing 15 to move a web 68 of recording or graph paper transversely of the pull shaft 28, beneath the stylus 61, in response to longitudinal movement of the sled 10. Such means comprises a frame including upstanding frame sides 69 and 70, extending transversely of the pull shaft 28 and adjusting shaft 60, and rigidly connected at their bottoms by transverse plates 71, in turn suitably rigidly mounted upon the bottom wall of the casing 15. The frame sides 69 and 70 are spaced apart a substantial distance and parallel, and the frame sides extend for the major portion of the width of the casing 15, as shown in Figure 3.

A supply roll 72 for the web 68 of recording paper is journaled upon frame sides 69 and 70 near corresponding ends of the same, and the supply roll 72 is spaced upon one side of the pull shaft 28 and below the same, as shown in Figures 3 and 4. A take-up roll 73 for the web 68 is removably journaled upon the frame sides 69 and 70, near the other corresponding ends of the same, and this take-up roll is spaced from the opposite side of the pull shaft 28 and below the same. The flanges 73' of the take-up roll 73 are preferably removable, so that the graph paper recordings may readily be removed from the take-up roll intact. An intermediate removable roll or platen 74 is journaled upon the frame sides 69 and 70, near the longitudinal centers of the same and directly beneath the pull shaft 28. Suitable web tensioning rolls or idlers 75 and 76 are likewise journaled upon the frame sides 69 and 70, adjacent to the opposite sides of the platen 74, and the web 68 of recording paper is payed off of the lower side of the supply roll 72 and trained under the idler 75, over the top of the platen 74, under the idler 76, and then wound upon the take-up roll 73 at the top of the same, Figure 5. The web 68 of recording paper is adapted to be fed transversely of the pull shaft 28 and beneath the stylus 61, in the direction of the arrows in Figure 5.

Just inwardly of the forwardmost frame side 69, the take-up roll 73 is provided with a pulley 77 around which is trained an endless belt 78. The pulley 77 is preferably separate from the adjacent roll flange 73', and keyed to the axle 73a of the take-up roll for driving the same. The belt 78 is also trained about a grooved pulley or disk 79, constituting one end of the removable platen 74, and the belt 78 is maintained taut by a belt tensioning pulley 80, journaled upon an arm 81, rockably mounted upon a pin 82, rigidly mounted upon the adjacent frame side 69. A retractile coil spring 83 has one end secured to the arm 81, for drawing the same downwardly, and the other end of the spring is suitably anchored at 84 to the frame side 69. The arrangement is such that rotation of the platen 74, through gearing to be described, causes the take-up roll 73 to rotate in the same direction as the platen, for winding up the web 68 of recording paper.

The axle 85 of the platen 74 has a relatively large gear 86 secured to its end, for rotation therewith, rearwardly of the frame side 70. This gear 86 meshes with a relatively small gear 87, carried by a stub shaft 88, journaled upon the adjacent frame side 70 in spaced relation to the axle 85. A larger gear 89, rigidly secured to the small gear 87 to turn therewith, meshes with a small driving pinion 90, journaled upon a bearing 91, rigidly secured to the outer face of the frame side 70.

The rear unit 12 of the apparatus comprises a suitable mounting block 92, bolted or otherwise rigidly secured to the rear end of the sled 10 as indicated in Figures 1 and 2. A vertically and horizontally swingable yoke comprising generally parallel longitudinal arms 93 has its forward end hinged at 94 to a U-shaped bracket 95, in turn pivoted upon the block 92 at 92'. The rear ends of the arms 93 are secured to the axle 96 of a bicycle wheel extending between the yoke arms 93, as indicated.

The rotating hub portion 98 of the wheel 97 is provided at one end with an apertured sprocket wheel or disk 99, rigidly secured thereto for rotation therewith. A toothed sprocket wheel or gear 100 meshes with the apertured sprocket wheel 99, and is arranged at an acute angle to the axle 96, and journaled in a suitable bearing 101, in turn rigidly secured to one of the yoke arms 93 by means of an extension plate 102.

The rear end of a flexible drive shaft 103 is operatively connected with the sprocket gear 100 to be driven thereby, and the drive shaft 103 extends longitudinally forwardly to the forward unit 11, and enters the casing 15 through a suitable opening in the side wall thereof. The forward end of the flexible drive shaft 103 is connected with the driving pinion 90 for operating the same, and the flexible drive shaft is preferably secured to one of the yoke arms 93, at an intermediate point, by means of a clip 104 or the like.

The operation of the apparatus is as follows: With the units 11 and 12 attached to the sled 10 and arranged as shown in Figures 1 and 2, the test subject or individual is connected with the rope 45, forwardly of the pulley 13 by a suitable body harness, not shown. A given load may be placed upon the sled 10, and the subject then proceeds to pull the sled forwardly over snow, or any other type of surface upon which it is desired to conduct the test.

It should be mentioned prior to proceeding with the description of the operation, that a spring 57 of the proper size and strength is chosen prior to the test, depending upon the magnitude of the test load, and the range of forces which it is anticipated transmitting to the apparatus through the rope 45. In order to change or apply the spring 57 to the pull shaft 28, it is merely necessary to remove the tapered pin 53 sufficiently to disengage it from the forward pull shaft section 28'. The pull shaft section 28' is then partially withdrawn through the forward bearing 26. The spring 57 is then readily removable from the shaft section 28', and may be replaced with a correct spring 57 or combination of springs, which engage the grooves 56 of head 49.

With the proper spring 57 or springs mounted upon the pull shaft section 28', as above described, the nuts 30 and 31 are operated for moving the pull shaft slightly to compensate for minor differences in spring length, which adjustment brings the head 49 to the point of zero pressure against the spring or springs 57. Finally, the precise adjustment of the stylus pin 62 to the base line 105 of the recording paper is made by means of the stylus adjusting nut 64a.

With the above preliminary adjustments completed, the test subject begins to pull the sled 10 forwardly. As the sled is pulled, the pull shaft 28, head 49, and associated elements will move forwardly relative to the fixed uprights 19 and 20, and the calibrated spring 57 will be compressed according to the amount of pull placed upon the rope 45. As the sled begins to move in response to the pull upon the rope 45, rotation of the wheel 97 will cause sprocket gear 100 to drive the pinion 90, through the medium of the flexible drive shaft 103. The platen 74 will accordingly be driven through the gearing 86—87—89 to advance the web 68 of recording paper in the direction of the arrows in Figure 5. The web 68 is rolled over the platen 74 in a fixed ratio to the distance traveled by the trailing wheel 97; in the present embodiment of the invention, the paper web 68 will be advanced one inch, for each 65 inches of traveling of the bicycle wheel 97 over the ground, or, in other words there is a 65 to 1 gear reduction between the wheel 97 and platen 74.

The stylus 61, during the above described actions recording the locus of a point upon the web 68 of graph paper, which, at any instant, on the distance base is a measure of the force required to pull the sled. Integration of the area under the curve is done with a planimeter. The average force is determined by dividing area by distance. Since each test operation is carefully timed with a stop watch, calculation of power is possible. Efficiency is calculated by dividing energy expenditure by the man (input) by the work measurement (output).

It is to be understood that the form of our invention, herewith shown and described is to be taken as a preferred example of the same, and that various changes in the shape, size and arrangement of parts may be resorted to, without departing from the spirit of the invention or scope of the subjoined claims.

Having described our invention, we claim:

1. Apparatus for measuring the work required to pull a trailing load comprising supporting means secured to the load, means forming a guide slot extending longitudinally of the line of movement of the load and secured to said supporting means, a reciprocatory member connected with the supporting means for movement longitudinally of the guide slot and adapted for connection with a source of pulling power, resilient means engaging the reciprocatory member to resist movement of the same in the direction of the pulling force, a head secured to said reciprocatory member for movement therewith and having a part engaging said guide slot to prevent rotation of the head and reciprocatory member, a recording stylus secured to the head and bodily movable with the head and reciprocatory member, a web of recording paper adapted to be moved transversely of the line of movement of the reciprocatory member and stylus, a rotary platen receiving the web of recording paper and supporting the same for contact with the stylus, supply and take-up rolls for the web of recording paper arranged upon opposite sides of the platen and receiving the web, driving connecting means between the rotary platen and take-up roll, reduction gearing connected with the rotary platen for operating the same at a relatively low speed of rotation, a ground engaging wheel connected with the load in spaced relation to said supporting means, gearing connected with the ground engaging wheel and driven thereby, and a flexible drive shaft connecting the last-named gearing and said reduction gearing so that movement of the load in one direction will effect feeding of the web of graph paper simultaneously with the movement of said reciprocatory member.

2. Apparatus for measuring the work required to pull a trailing load comprising supporting means secured to the load, a shaft movably connected with the supporting means for reciprocation longitudinally of the line of movement of the load, a coupling having swiveled connection with said shaft and adapted for connection with a source of pulling power, a head secured to said shaft for movement therewith, guide means carried by said supporting means and engaging the head to prevent rotation of the head and shaft, a calibrated coil spring surrounding the shaft and having one end engaging the head and compressed by the head when the shaft moves longitudinally in one direction, a recording stylus carried by the head, means connected with the shaft for effecting preliminary longitudinal adjustment of the same, means connected with the recording stylus for effecting fine adjustment of the same longitudinally of said shaft, recording paper feed means mounted adjacent to said supporting means and adapted to feed recording paper at right angles to the line of movement of the shaft and stylus while the stylus contacts the recording paper, and means connected with said recording paper feed means to drive the same in response to movement of the load in one direction.

3. Apparatus for measuring the work required to pull a trailing load comprising a support secured to the load, a reciprocatory pull shaft connected with the support and extending longitudinally of the line of movement of the load, a coupling having swiveled connection with the pull shaft and adapted for connection with a source of pulling power, resilient means engaging said pull shaft to resist movement of the same in the direction of the pulling force, a pair of guide bars secured to the support above the pull shaft and forming a guide slot longitudinally of the pull shaft, a head secured to the pull shaft below the guide bars and having a part engaging the guide slot to prevent rotation of the pull shaft and head, a sleeve carried by the head below said pull shaft and extending longitudinally of the pull shaft, a shaft movably mounted with said sleeve and having a screw-threaded part, elements having screw-threaded engagement with said screw-threaded part for effecting longitudinal adjustment of the last-named shaft, a recording stylus secured to the last-named shaft and depending therefrom, recording paper support and feeding means mounted upon the support below the pull shaft and stylus and adapted to feed the recording paper transversely of the pull shaft with the stylus in contact with the recording paper, reduction gearing connected with the recording paper support and feeding means, a movable ground engaging element secured to the support in trailing relation therewith, and driving connecting means between said reduction gearing and ground engaging element.

4. Apparatus for measuring the work required to pull a trailing load comprising a pair of spaced uprights secured to the load in opposed relation, substantially frictionless bearings mounted upon the spaced uprights in substantial alignment, a reciprocatory shaft engaging the bearings and supported thereby and extending forwardly and rearwardly of the uprights, said shaft having a screw-threaded part forwardly of the forward upright, a stop element carried by the rear end of the reciprocatory shaft and engageable with the rear upright to limit the forward movement of the shaft, an adjusting nut carried by the screw-threaded part of the shaft and adapted to engage the forward upright, a swiveled coupling secured to the shaft forwardly of said screw-threaded part and adapted for connection with a source of pulling power, guide bars secured to the tops of the uprights above said shaft and extending longitudinally thereof, a head secured to the shaft between said uprights and engaging between the guide bars, a coil spring surrounding the shaft between the head and forward upright and compressed therebetween when the shaft is pulled forwardly by the source of pulling power, a sleeve secured to the bottom of the head below said shaft and having its bore substantially parallel therewith, an adjusting shaft mounted within the bore of the sleeve and having a screw-threaded part, an adjusting nut carried by said screw-threaded part of the adjusting shaft for effecting longitudinal movement of the same within the bore of the sleeve, a recording stylus carried by the forward end of said adjusting shaft, a rotary platen journaled beneath the stylus and adapted to receive a web of recording paper to be engaged by the stylus, feed and take-up rolls for the recording paper journaled upon opposite sides of the platen, driving connecting means between the platen and take-up roll, reduction gearing connected with the platen to drive the same, a ground engaging wheel hingedly secured to the load in trailing relation therewith, a gear connected with the wheel and driven thereby, and a flexible shaft connecting the last-named gear and said reduction gearing.

5. Apparatus for measuring the work required to pull a trailing load comprising supporting means to be secured to the load, longitudinal guide means carried by the supporting means, a reciprocatory element engaging the longitudinal guide means and guided thereby and having a bore, pull shaft sections having ends engaging within said bore, said pull shaft sections extending longitudinally beyond opposite sides of said reciprocatory element, means for detachably securing one pull shaft section within the bore of the reciprocatory element, means connected with one pull shaft section for attaching the same to a source of pulling power, a calibrated coil spring surrounding said one pull shaft section and having one end engaging a side of said reciprocatory element and readily removable from said one pull shaft section when the same is disengaged from the bore of the reciprocatory element, a stylus secured to the reciprocatory element for movement therewith, movable recording means arranged adjacent to the stylus and engaging the stylus to receive an impression from the stylus, movable ground engaging means secured to the load in trailing relation thereto, and driving connecting means between said ground engaging means and said movable recording means.

6. Apparatus for measuring the work required to pull a trailing load comprising spaced upstanding supports, aligned bearings carried by the supports, a pull shaft including aligned shaft sections mounted within the bearings for reciprocation, said shaft sections being separated between said supports, longitudinal guide means secured to said supports longitudinally of the pull shaft, a head engaging said guide means between the supports and guided thereby during reciprocation of the pull shaft and having a bore receiving the adjacent ends of the shaft sections between said supports, removable pin means engaging the head and shaft sections for detachably securing the shaft sections within the bore of the head, a coil spring surrounding one of said shaft sections between said head and one support and adapted to be compressed therebetween when the pull shaft moves longitudinally in one direction, means connected with the pull shaft for securing the same to a source of pulling power, a recording element carried by the head for movement therewith, movable recording means arranged adjacent to the recording element and engaged by the recording element for receiving a recording impression, movable ground engaging means secured to the load in trailing relation thereto, and driving connecting means between said ground engaging means and movable recording means.

References Cited in the file of this patent

UNITED STATES PATENTS

| | | |
|---|---|---|
| 504,286 | Stone | Aug. 29, 1893 |
| 1,417,461 | Eason | May 23, 1922 |
| 1,433,067 | Burr | Oct. 24, 1922 |
| 2,559,800 | Ryan | July 10, 1951 |